US010178821B2

(12) United States Patent
Bos (10) Patent No.: US 10,178,821 B2
(45) Date of Patent: *Jan. 15, 2019

(54) ROTOR SHAFT FOR USE IN AN AERATING DEVICE

(71) Applicant: Redexim Handel- en Exploitatie Mij. BV, Zeist (NL)

(72) Inventor: Anton Cornelis Bos, Doorn (NL)

(73) Assignee: Redexim Handel- en Expoitatie Mij. BV, Zeist (NL)

(*) Notice: Subject to any disclaimer, the term of this patent is extended or adjusted under 35 U.S.C. 154(b) by 0 days.

This patent is subject to a terminal disclaimer.

(21) Appl. No.: 15/628,202

(22) Filed: Jun. 20, 2017

(65) Prior Publication Data

US 2017/0280613 A1 Oct. 5, 2017

Related U.S. Application Data

(63) Continuation of application No. 14/439,117, filed as application No. PCT/NL2013/050752 on Oct. 25, 2013, now Pat. No. 9,713,297.

(30) Foreign Application Priority Data

Oct. 30, 2012 (NL) ..................................... 2009729

(51) Int. Cl.
*A01B 33/14* (2006.01)

(52) U.S. Cl.
CPC .................................. *A01B 33/142* (2013.01)

(58) Field of Classification Search
CPC ....... A01B 45/00; A01B 45/02; A01B 45/026; A01B 33/103; A01B 33/142
See application file for complete search history.

(56) References Cited

U.S. PATENT DOCUMENTS

| 903,119 | A | 11/1908 | Waterman |
| 907,509 | A | 12/1908 | Kramer |
| 1,095,812 | A | 5/1914 | Carroll |
| 2,022,433 | A | 11/1935 | Roemer |
| 2,374,528 | A | 4/1945 | Emde et al. |

(Continued)

FOREIGN PATENT DOCUMENTS

| AU | 2008202832 B1 | 5/2009 |
| FR | 2330295 A1 | 6/1977 |

(Continued)

*Primary Examiner* — Jamie L McGowan
(74) *Attorney, Agent, or Firm* — Rudy J. Ng; Bret E. Field; Bozicevic, Field & Francis LLP (57) ABSTRACT

Rotor shaft for use in an aerating device for a ground, wherein the rotor shaft comprises at least one connecting disc which extends transversely of the axis of the rotor shaft and on which at least two knives are arranged, wherein each knife is provided with two knife connecting holes and is connected between the connecting disc and a connecting ring, wherein the connecting disc and the connecting ring are provided with knife connecting holes which coincide with the knife connecting holes of the knives, wherein bolts are arranged through the coinciding knife connecting holes in order to connect the connecting disc, the knives and the connecting ring, wherein the connecting ring is constructed from at least two ring sectors which together form the connecting ring.

15 Claims, 4 Drawing Sheets

(56) References Cited

U.S. PATENT DOCUMENTS

| | | | |
|---|---|---|---|
| 2,477,662 A | | 8/1949 | Seaman |
| 2,560,359 A | | 7/1951 | McCardell |
| 2,603,049 A | | 7/1952 | Mullin |
| 2,754,744 A | | 7/1956 | Hall |
| 2,802,408 A | | 8/1957 | Seaman |
| 3,425,467 A | * | 2/1969 | Willis .................. B27G 13/005 144/218 |
| 3,557,880 A | | 1/1971 | Born |
| 3,661,213 A | | 5/1972 | Taylor |
| 3,702,638 A | | 11/1972 | Takata |
| 4,083,315 A | | 4/1978 | Crabbs |
| 4,180,107 A | * | 12/1979 | Grover ................. A01G 23/067 144/218 |
| 5,115,845 A | * | 5/1992 | Hooser ................. A01G 23/067 144/208.9 |
| 6,854,525 B2 | * | 2/2005 | Martindale .......... A01B 33/103 111/121 |
| 2011/0155401 A1 | | 6/2011 | Martindale et al. |

FOREIGN PATENT DOCUMENTS

| | | |
|---|---|---|
| FR | 2658696 A1 | 2/1990 |
| GB | 2403121 A | 12/2004 |
| WO | WO2004028236 A2 | 4/2004 |

* cited by examiner

ROTOR SHAFT FOR USE IN AN AERATING DEVICE

The present invention relates to a rotor shaft for use in an aerating device for a ground, wherein the rotor shaft comprises at least one connecting disc which extends transversely of the axis of the rotor shaft and on which at least two knives are arranged, wherein each knife is provided with two knife connecting holes and is connected between the connecting disc and a connecting ring, wherein the connecting disc and the connecting ring are provided with knife connecting holes which coincide with the knife connecting holes of the knives, wherein bolts are arranged through the coinciding knife connecting holes in order to connect the connecting disc, the knives and the connecting ring. The invention also relates to an aerating device provided with such a rotor shaft.

For the purpose of aerating a ground, particularly a ground provided with a grass cover, it is known to arrange slits in this ground using an aerating device provided with a rotor shaft on which knives are arranged. As the device advances over the ground the knives arranged on the rotating shaft are carried successively into the ground and form slits therein. Such slits have a positive effect on the grass cover.

A typical rotor shaft is provided here with a number of connecting discs arranged fixedly on the shaft, i.e. substantially without play. Arranged on these discs are several knives, for instance two, more often three, protruding beyond the peripheral edges of these discs. The knives here also lie roughly transversely of the axis of the rotor shaft and are arranged at regular positions on the disc so that they are evenly distributed over the peripheral edge.

The knives are arranged on the connecting disc using a connecting ring. Such a connecting ring has an outer periphery roughly corresponding to the periphery of the connecting disc so that they can as it were be placed one onto the other. The knives are placed here between the connecting disc and the connecting ring, wherein the disc and the ring as it were clamp the knives. The knives are generally provided with an outer end taking a flat form in which at least two knife connecting holes are arranged. Just as the connecting ring, the connecting disc is also provided close to the peripheral edge with corresponding connecting holes. Inserted through the coinciding holes of the ring, the knives and the disc are bolts onto which nuts are screwed. A firm connection is thus obtained, wherein it is even possible to replace a knife should this be necessary.

The rotor shaft is after all rotated at high speed so that the forces on the knives are also great. It is not therefore unusual for a knife to be damaged, for instance by a rock in the ground. The bolts and nuts of the associated knife can then be loosened, after which the knife can be removed from between the connecting disc and the connecting ring and be replaced.

If the connecting ring is however also damaged, for instance deformed, it is then very difficult, if not impossible, to repair the rotor shaft. The present invention has for its object, among others, to at least partially obviate this problem.

The rotor shaft of the type stated in the preamble has for this purpose the special feature that the connecting ring is constructed from at least two ring sectors which together form the connecting ring. If the connecting ring, i.e. one or even more of the ring sectors, is now damaged it can be easily removed by removing the bolts of the relevant ring sector(s). A damaged sector can then be taken off the connecting disc and rotor shaft and replaced in simple manner. In the case that a continuous ring is used this is more difficult, particularly when different discs are arranged on the shaft. The discs on the shaft can then block removal of the ring, while placing of a new ring is not possible either. The shaft will in that case therefore have to be disassembled. This problem is solved by constructing the connecting ring of the rotor shaft, or rotor shaft assembly, from different, i.e. separate, ring sectors which together form a connecting ring in the coupled state.

For the sake of clarity the term ring sector must be understood to mean the form of a ring enclosed between two radii from the centre. A plurality of connected ring sectors form a ring here.

Although the outer ends of the ring sectors, i.e. the edges between the two circular arcs, can be embodied straight and parallel to the radii, this is not essential. It is however advantageous for the outer ends of two ring sectors to take a complementary form so that they fit closely in the connected state. This provides for a good force transmission. The connecting ring, i.e. the ring sectors, preferably takes a plate-like form.

According to a preferred embodiment the ring sectors are uniform. In other words, the ring sectors all have the same shape. This enables easy replacement of the components if necessary.

According to a further preferred embodiment of the rotor shaft, each ring sector is provided close to the outer ends with a knife connecting hole, wherein a ring sector is connected to two knives and extends therebetween. Each knife is therefore simultaneously connected to two ring sectors. In the case of damage or deformation of one ring sector a knife is still held by another ring sector, this enhancing reliability and safety.

For the purpose of a good angle of incidence of the knives into the ground it is advantageous for the knife connecting holes of, or for, a single knife to be located at different radial distances. In order however to limit the size of the connecting ring here in radial direction a ring sector can be provided with at least one protrusion for accommodating a knife connecting hole. The first knife connecting hole can for instance extend close to the inner periphery of the ring sector, while the second knife connecting hole extends close to the outer periphery, wherein the protrusion is arranged for strengthening purposes. It is for instance possible for the knife connecting hole to be arranged at least partially in the protrusion.

As stated, the outer ends of the knives, in which the knife connecting holes are also arranged, are situated between the connecting disc and the connecting ring, which is constructed according to the invention from a plurality of ring sectors. Now that the knives do not extend over the whole peripheral edge of the disc and the ring, there are spaces between the knives. In order to fill these spaces a further preferred embodiment of a rotor shaft according to the invention further comprises ring sector-shaped filling members between the knives, wherein a filling member has a form such that on the one hand it fills the space between the connecting disc and the connecting ring as seen in a direction transversely of the plane of the connecting disc and on the other the space between two knives as seen in a direction parallel to the plane of the connecting disc. A filling member has the same thickness here, i.e. as seen in the direction of the axis of the rotor shaft, as the thickness of the outer end of the knife so that the transition from the knife to a filling member is smooth. The connecting ring can then be arranged thereon. In the plane of the connecting disc the form is defined by the contours of the knives so that the filling members lie firmly against the knives in the connected state. The two outer ends of a filling member preferably take a form here complementary to that of the knives.

According to a further preferred embodiment, a filling member is provided with at least one filling member connecting hole and wherein the connecting ring and connecting disc are provided with filling member connecting holes which coincide with the filling member connecting holes of the filling members, wherein bolts are arranged through the coinciding filler piece connecting holes in order to connect the connecting disc, the filling members and the connecting ring. The filling members are embodied here as separate, i.e. releasable, components so that they can also be exchanged in simple manner in case of damage. A strong assembly is obtained when the connecting ring overlaps the filling members in the connected state.

It has moreover been found that the use of separate filling members which can be attached using bolts and nuts makes the rotor shaft better able to withstand the high peak forces during use. Each filling member is preferably provided with a plurality of filling member connecting holes, for instance two or three, so that possible torsion of the filling members is counteracted. The filling member connecting holes preferably lie at equal radial distances relative to the centre of the connecting disc.

In this embodiment the connecting disc is therefore provided with pairs of knife connecting holes close to the peripheral edge for the purpose of connecting knives, wherein at least one, preferably two or three, filling member connecting holes are arranged between each of these pairs of knife connecting holes for the purpose of arranging the filling members between the knives.

It must be noted that it is also possible to apply the filling members as described above in a rotor shaft, wherein the connecting ring is embodied as a single ring, so without the use of the ring sectors. The advantages of efficient exchange of the filling members and the better force transmission are also achieved in such an embodiment.

It is recommended however that the connecting ring is also constructed from separate ring sectors as described. A ring sector is then provided with a filling member connecting hole coinciding with a filling member connecting hole of a filling member. As stated, it is recommended that a ring sector connects two knives so that a ring sector extends over two knives so that it partially overlaps them. The filling member is then arranged between these knives as seen in the plane of the connecting disc, and therefore between the connecting disc and this ring sector as seen in a direction transversely of the plane of the connecting disc. A ring sector preferably overlaps a filling member almost wholly.

According to a further preferred embodiment, the filling members and the knives form a continuous annular structure in the connected state. This results in a stable assembly, wherein play between the knives and the connecting disc, the filling members and the connecting ring is prevented as far as possible. It is advantageous here for the knives to be held in form-fitting manner between the filling members, the connecting disc and the connecting ring.

In order to further improve the connection between knife and rotor shaft and to reduce the chance of play it is advantageous for a knife to be provided with a recess which forms a contact surface with a normal with a component in the radial direction, wherein a filling member is provided with a projection with a form complementary to the contact surface of the recess. The recess is preferably located at the outermost end of the knife. It is moreover advantageous for a good fit for the projection to be arranged at an outer end of a filling member.

According to a further preferred embodiment, the filling member connecting holes have a diameter differing from that of the knife connecting holes. The diameters of the knife connecting holes are preferably larger since the forces on these connections are greater. The use of different diameters moreover makes the assembly of the rotor shaft simpler since it is immediately apparent which hole serves which purpose.

The invention further relates to an aerating device for a ground, comprising:
a frame;
moving means arranged on the frame for the purpose of moving the aerating device in a direction of movement over a surface for working;
a drive;
a rotor shaft according to the invention operatively connected to the drive for the purpose of rotating the rotor shaft.

An aerating device provided with a rotor shaft as described above is efficient in use since in the case of possible damage to components, such as a knife or the connecting ring, these components can preferably be replaced in simple manner on site.

A preferred embodiment of the aerating device further comprises a housing which protects at least the rotor shaft, wherein the housing is provided with a hatch which is arranged hingedly on the housing for the purpose of making the rotor shaft accessible. The hatch is then movable between an opened position, in which the rotor shaft with knives is accessible or even removable, and a closed position in which the hatch together with the housing protects the rotor shaft. Opening the hatch makes the rotor shaft accessible so that components can be replaced if necessary. Complete disassembly of the housing or the removal of parts of this housing is then not necessary.

The invention also relates to a ring sector and a ring sector-shaped filling member for use in a rotor shaft according to the invention.

The invention further relates to a rotor shaft for use in an aerating device for a ground as such, wherein the rotor shaft comprises at least one connecting disc which extends transversely of the axis of the rotor shaft and in which pairs of knife connecting holes are arranged close to the peripheral edge at equal distances from each other, and wherein at least one filling member connecting hole is arranged between the pairs of knife connecting holes. The filling member connecting hole more preferably has a diameter differing from that of the knife connecting holes. A plurality of filling member connecting holes are preferably arranged between the knife connecting holes.

The present invention is further illustrated with reference to the following figures, which show a preferred embodiment of the device according to the invention and are not intended to limit the scope of the invention in any way, wherein.

Figure 1:
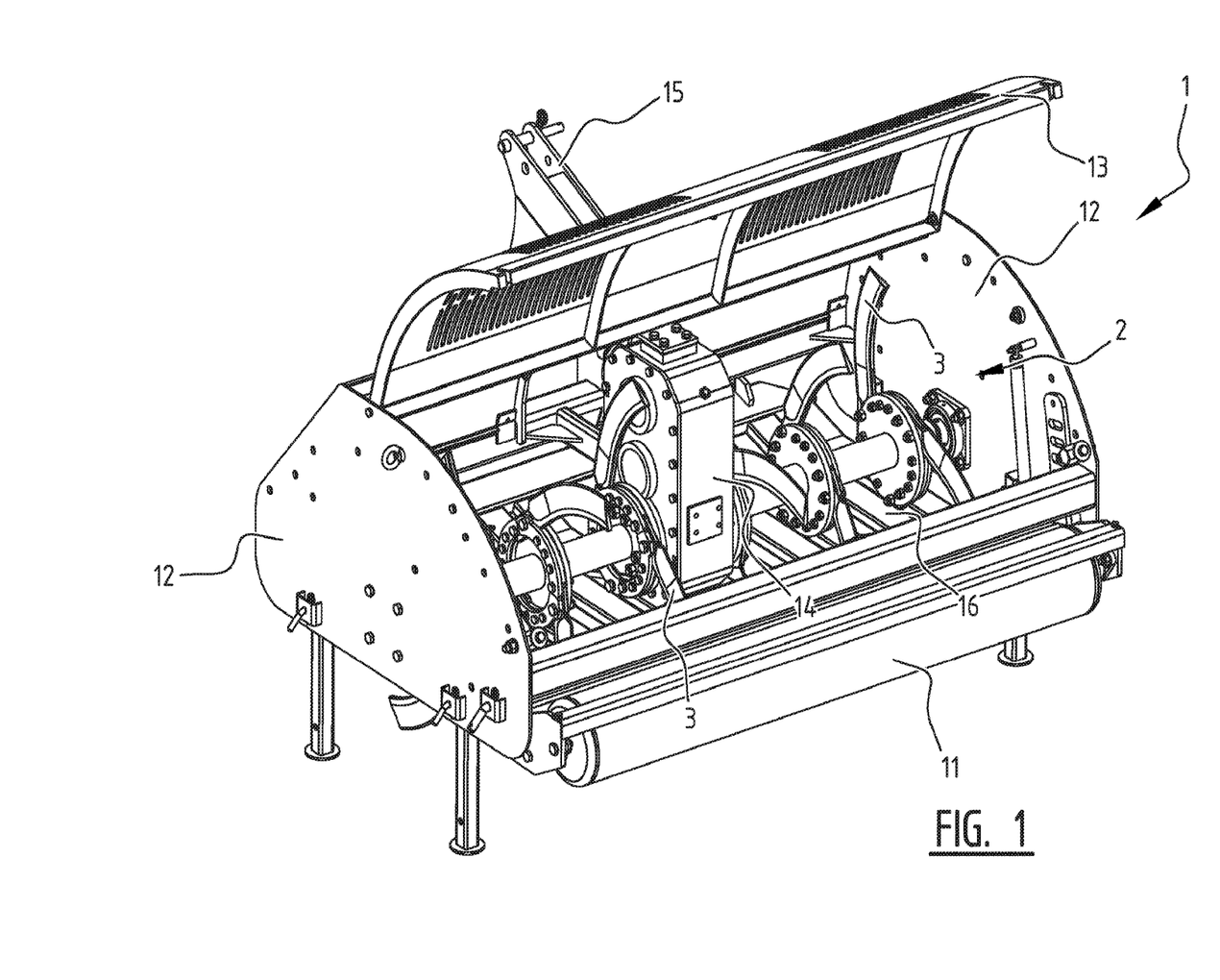
FIG. 1 is a perspective view of an aerating device.

FIG. 1 shows an aerating device 1 provided with a frame 16, moving means embodied as travel roller 11 and a drive embodied as transmission 14 in which a power take-off of a tractive vehicle can be arranged. Device 1 can be connected to a tractive vehicle using an attachment 15. Connected to transmission 14 is a rotor shaft 2 which is arranged bearing-mounted in device 1 so that it can rotate. A plurality of knives 3 is arranged on rotor shaft 2, as will be described in more detail below. Device 1 is also provided with a housing 12 in which a hatch 13 is arranged. Opening the hatch 13 makes rotor shaft 2 accessible, for instance for the purpose of replacing components of rotor shaft 2.

Figure 2:
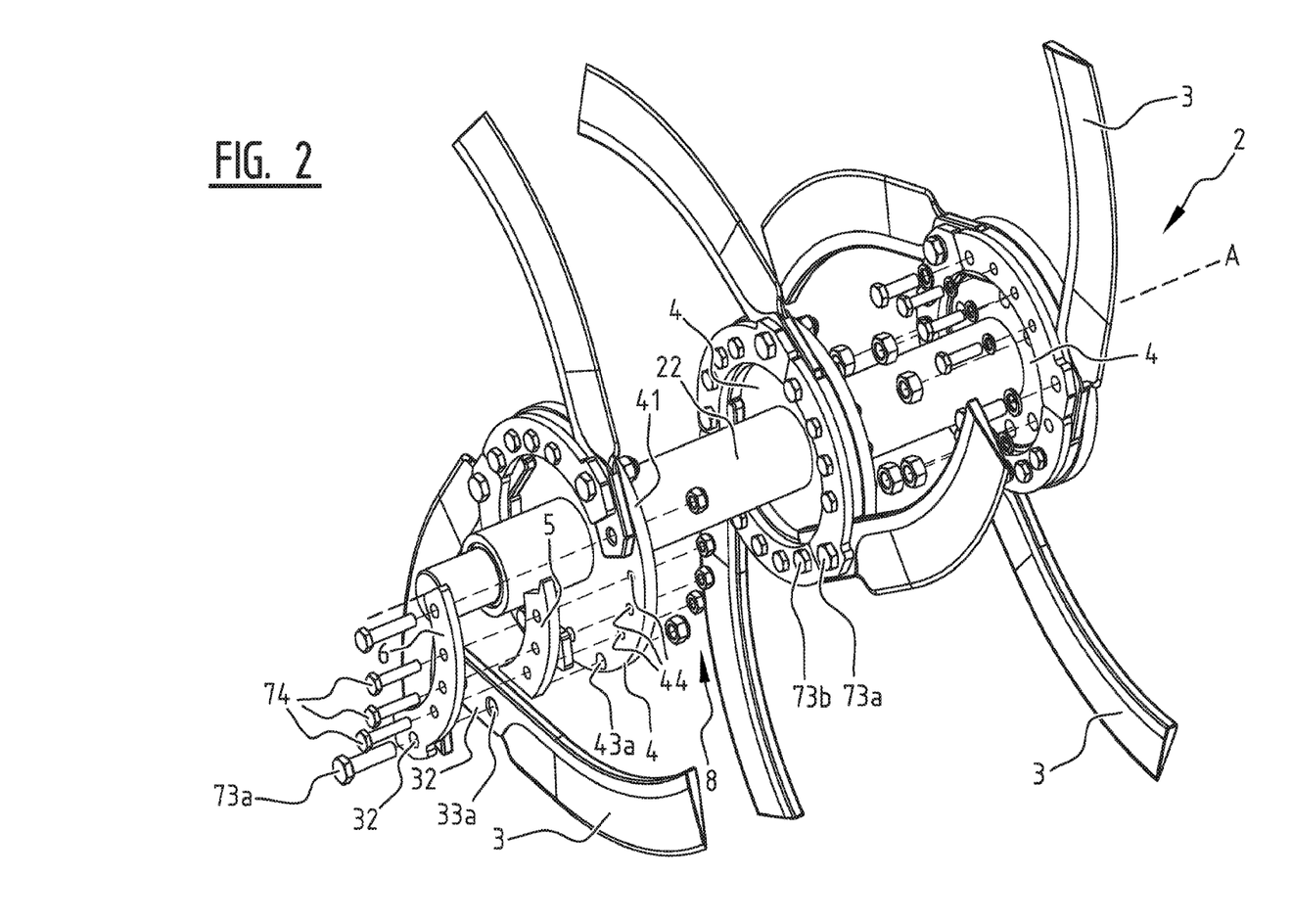
FIG. 2 is a schematic perspective view of the rotor shaft according to the invention.

FIG. 2 shows a part of rotor shaft 2 of FIG. 1 in detail. Rotor shaft 22 is connected to the frame. Fixedly connected to rotor shaft 22 are connecting discs 4 extending perpendicularly of axis A of rotor shaft 22. Connecting discs 4 are embodied as round plates welded onto rotor shaft 22. Three knives 3 are arranged per connecting disc 4, wherein knives 3 are distributed evenly over peripheral edge 41 of discs 4. Knives 3 protrude beyond these peripheral edges 41 and lie more or less in the plane of connecting discs 4.

Figure 3:
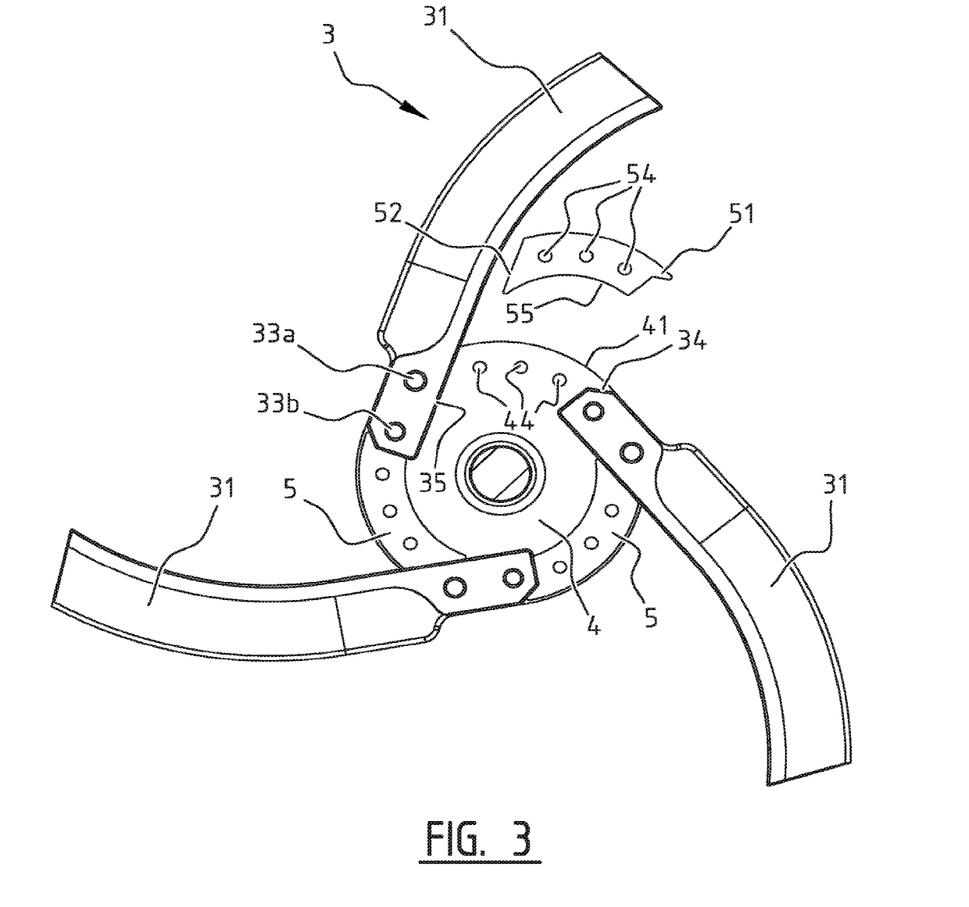
FIG. 3 is a schematic side view of the relation between the filling members and the knives.

Referring to FIG. 3, a knife 3 is provided with a sharp part or blade 31 and a connecting end 32 taking a flat or plate-like form. Two connecting holes 33a and 33b are arranged in this outer end 32, wherein the hole 33a closest to blade 31 has a larger diameter than the hole 33b close to the outer end. Outer end 32 of a knife 3 is moreover provided with a recess so that a sloping contact surface 34 is formed.

Connecting discs 4 are also provided close to their peripheral edge 41 with corresponding connecting holes 43a and 43b which coincide in the connected state with the connecting holes 33a and 33b of knives 3, see FIG. 2. Into these holes bolts 73a and 73b will later be inserted onto which nuts 8 are screwed.

FIG. 3 shows the distribution of the three knives 3 on the connecting disc, wherein the coinciding holes for connecting knife 3 to disc 4 are visible. Now that knives 3 do not cover the whole peripheral edge 41 of disc 4, filler pieces 5 are arranged which fit precisely onto the contours of knives 3. The three filler pieces 5 are provided with projections 51 which fit precisely onto the recess in the plate-like connecting end 32 of knives 3 so that they lie against the contact surface 34 of these knives 3. The other outer end 52 of a filler piece 5 takes a flat form so that it can lie against the straight surface 35 of knife 3.

Filler piece 5 takes the form of a ring sector, wherein outer periphery 53 has the same form, i.e. radius, as peripheral edge 41 of disc 4, as can be seen for arranged filler pieces at the bottom of FIG. 3. Inner periphery 55 of filler pieces 5 is formed more or less parallel to the outer periphery. The thickness of filler pieces 5, i.e. the thickness in the direction of axis A, or perpendicularly of the plane of connecting disc 4, is equal to the thickness of the plate-like outer end 32 of a knife 3. In the connected state of the filler pieces and the knives as shown at the bottom of FIG. 3 the surfaces of knives 3 and filler pieces 5 form a substantially flat surface.

For attachment of filler pieces 5 to rotor shaft 2 the filler pieces are provided with three holes 54 arranged at equal radial distances. Discs 4 are also provided with corresponding holes 44 which in the connected state coincide with holes 54 of the filler pieces so that bolts 74 can be placed therethrough, see again FIG. 2. The diameter of holes 44 and 54 is smaller than the diameter of holes 33 and 43 for connecting the knives 3.

Figure 4:
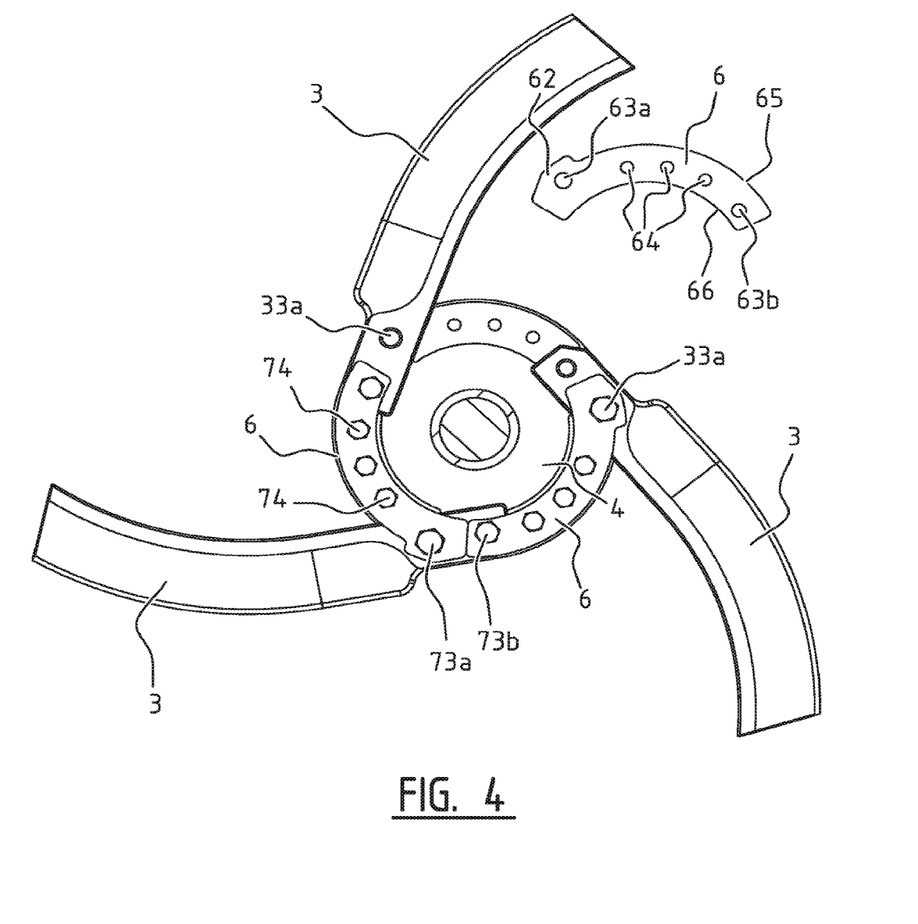
FIG. 4 is a schematic side view of the connecting disc of FIG. 3 with arranged ring parts.

Ring parts 6 are arranged over the flat surface formed by outer ends 32 and filler pieces 5, see in particular FIG. 4. Ring parts 6 fit closely to each other at the outer ends so as to form an annular structure for attachment of knives 3 and filler pieces 5, wherein knives 3 and filler pieces 5 are situated between connecting disc 4 and ring parts 6 as seen in the direction of axis A.

A ring part 6 is also provided once again with a larger hole 63a and a smaller hole 63b for connecting the knives 3. A ring part 6 is connected here to two knives 3 so that the one outer end of a ring part comprises the one hole 63a while the other outer end comprises the other hole 63b. A subsequent ring part 6 is then in turn connected to the other hole 33a of a knife 3.

In order to provide sufficient strength around the larger hole 63a of ring part 6, the ring part is provided close to this outer end with a protrusion 62. This ensures sufficient material round hole 63. Also visible is that holes 63a and 63b are located at different radial distances. Also present once again between holes 63 for receiving bolts 73 for connecting the knives 3 are holes 64 for receiving bolts 74 for connecting the filler pieces 5. Holes 44 in the connecting disc, holes 54 in filler pieces 5 and holes 64 in ring parts 6 coincide here and have corresponding diameters. The same applies for holes 43a, 53a and 63a and 43b, 53b and 63b. The outer periphery 65 of a ring part 6 again corresponds to the shape of peripheral edge 41 of disc 4 and the inner periphery 66 of a ring part 6 corresponds to inner periphery 55 of a filler piece 5, so that filler pieces 5 are substantially wholly overlapped by a ring part 6 in the connected state, as can also be seen at the bottom of FIG. 4, in which the connected state is shown.

As stated, bolts 73 and 74 are arranged through the coinciding holes and nuts 8 are then screwed thereon. An efficient connection of knives 3 to rotor shaft 2 is thus obtained which can moreover be released in simple manner if a component of the rotor shaft is damaged.

The present invention is not limited to the shown embodiments but also extends to other embodiments falling within the scope of the appended claims.

The invention claimed is:

1. A rotor shaft for use in an aerating device for a ground, wherein the rotor shaft comprises at least one connecting disc which extends transversely of the axis of the rotor shaft and on which at least two knives are arranged, wherein each knife is provided with two knife connecting holes and is connected between the connecting disc and a connecting ring, wherein the connecting disc and the connecting ring are provided with knife connecting holes which coincide with the knife connecting holes of the knives, wherein bolts are arranged through the coinciding knife connecting holes in order to connect the connecting disc, the knives and the connecting ring, wherein the connecting ring is constructed from at least two ring sectors which together form the connecting ring, and a ring sector is connected to two knives and extends therebetween.

2. The rotor shaft as claimed in claim 1, wherein the ring sectors are uniform.

3. The rotor shaft as claimed in claim 1, wherein each ring sector is provided close to the outer ends with a knife connecting hole.

4. The rotor shaft as claimed in claim 1, wherein the knife connecting holes for a single knife are located at different radial distances, wherein a ring sector is provided with at least one protrusion for accommodating a knife connecting hole.

5. The rotor shaft as claimed in claim 1, further comprising ring sector-shaped filling members between the knives, wherein a filling member has a form such that it fills on the one hand the space between the connecting disc and the connecting ring and on the other the space between two knives, wherein a filling member is provided with at least one filling member connecting hole and wherein the connecting ring and connecting disc are provided with filling member connecting holes which coincide with the filling member connecting holes of the filling members, wherein bolts are arranged through the coinciding filling member connecting holes in order to connect the connecting disc, the filling members and the connecting ring.

6. The rotor shaft as claimed in claim 5, wherein the filling members and the knives form a continuous annular structure in the connected state, wherein the knives are held in form-fitting manner between the filling members, the connecting disc and the connecting ring.

7. The rotor shaft as claimed in claim 5, wherein a knife is provided with a recess which forms a contact surface with a normal with a component in the radial direction, wherein a filling member is provided with a projection with a form complementary to the contact surface of the recess.

8. The rotor shaft as claimed in claim 7, wherein the projection is arranged at an outer end of a filling member.

9. The rotor shaft as claimed in claim 5, wherein the filling member connecting holes have a diameter differing from that of the knife connecting holes.

10. An aerating device for a ground, comprising:
a frame;
moving means arranged on the frame for the purpose of moving the aerating device in a direction of movement over a surface for working;
a drive; and
a rotor shaft as claimed in claim 1 operatively connected to the drive for the purpose of rotating the rotor shaft.

11. The aerating device as claimed in claim 10, further comprising a housing which protects at least the rotor shaft, wherein the housing is provided with a hatch which is arranged hingedly on the housing for the purpose of making the rotor shaft accessible.

12. The rotor shaft as claimed in claim 1, wherein the connecting ring comprises three ring sectors.

13. The rotor shaft as claimed in claim 5, wherein the rotor shaft comprises three ring sector-shaped filling members.

14. The rotor shaft as claimed in claim 5, wherein a ring sector of connecting ring wholly overlaps the filling member.

15. The rotor shaft as claimed in claim 5, wherein the ring sector-shaped filling members have a thickness in the direction of the axis of the rotor shaft equal to a thickness an end of a knife.

* * * * *

UNITED STATES PATENT AND TRADEMARK OFFICE
CERTIFICATE OF CORRECTION

| | | |
|---|---|---|
| PATENT NO. | : 10,178,821 B2 | Page 1 of 1 |
| APPLICATION NO. | : 15/628202 | |
| DATED | : January 15, 2019 | |
| INVENTOR(S) | : Anton Cornelis Bos | |

It is certified that error appears in the above-identified patent and that said Letters Patent is hereby corrected as shown below:

On the Title Page

Please correct the name of the assignee so that it reads:
"(73) Redexim Handel- en Exploitatie Mij. BV, Zeist (NL)"

Signed and Sealed this
Tenth Day of December, 2019

Andrei Iancu
*Director of the United States Patent and Trademark Office*